US012713310B2

(12) United States Patent
Kordybach et al.

(10) Patent No.: US 12,713,310 B2
(45) Date of Patent: Aug. 18, 2026

(54) DUAL CONNECTIVITY MOBILE COMMUNICATION SYSTEM

(71) Applicant: Nokia Technologies Oy, Espoo (FI)

(72) Inventors: Krzysztof Kordybach, Wroclaw (PL); Ahmad Awada, Munich (DE); Srinivasan Selvaganapathy, Bangalore (IN); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 556 days.

(21) Appl. No.: 18/032,965

(22) PCT Filed: Oct. 5, 2021

(86) PCT No.: PCT/EP2021/077332

§ 371 (c)(1),
(2) Date: Apr. 20, 2023

(87) PCT Pub. No.: WO2022/084019

PCT Pub. Date: Apr. 28, 2022

(65) Prior Publication Data

US 2023/0403613 A1 Dec. 14, 2023

(30) Foreign Application Priority Data

Oct. 21, 2020 (IN) ............................ 202041045909

(51) Int. Cl.
*H04W 36/00* (2009.01)
*H04W 36/36* (2009.01)

(52) U.S. Cl.
CPC . *H04W 36/00835* (2018.08); *H04W 36/0061* (2013.01); *H04W 36/00698* (2023.05); *H04W 36/0072* (2013.01); *H04W 36/362* (2023.05)

(58) Field of Classification Search
CPC .............................. H04W 36/00; H04W 36/36
See application file for complete search history.

(56) References Cited

U.S. PATENT DOCUMENTS 12,328,781 B2 * 6/2025 Yilmaz ................. H04W 76/19
2022/0103233 A1 * 3/2022 Zhou ...................... H04B 7/088

FOREIGN PATENT DOCUMENTS

IN 201817000338 A 3/2018
WO WO2015171044 A1 11/2015
WO WO2018231136 A1 12/2018

OTHER PUBLICATIONS

CATT,"TP for TS38423 BLCR Conditional SN AdditionChange Procedure" 3GPP TSG-RAN WG3 Meeting #106 R3-196729,tsgr3_1063GPP TSG-RAN WG3 Meeting #106 R3-196729,tsgr3_106; Nov. 22, 2019; 1-14,16-20.

(Continued)

*Primary Examiner* — Michael T Vu
(74) *Attorney, Agent, or Firm* — Lippes Mathias LLP

(57) ABSTRACT

An apparatus, method and computer program is described including sending an addition request from a master node of a dual connectivity mobile communication system to a target secondary node of the dual connectivity mobile communication system, wherein each addition request includes information relating to a maximum number of primary secondary cells that can be prepared for primary secondary cell change by said target secondary node; and receiving a response to the addition request from the target secondary node indicating how many primary secondary cells have been prepared by said target secondary node in response to said addition request.

11 Claims, 12 Drawing Sheets

(56) References Cited

OTHER PUBLICATIONS

NEC, "Inter-SN Conditional PSCell Change"; 3GPP TSG-RAN WG2 #111e R2-206977,tsgr2_111-e; Aug. 28, 2020; 2-10,13-18,21.
Qualcomm Incorporated, Conditional NR PSCell addition/change; 3GPP TSG-RAN WG2 Meeting #107bis R2-1912297,tsgr2_107bis; Oct. 18, 2019; 1-22.
ZTE et al., "(TP for NR_Mob_enh BL CR for TS 38.423) Introduction of Maximum Number of Candidate PScells Allowed by MN," 3GPP TSG-RAN3 Meeting #107bis-e, R3-201892, Apr. 20-30, 2020.
ZTE et al., "(TP for E-UTRA_Mob_enh BL CR for TS 36.423) Introduction of Maximum Number of Candidate PScells Allowed by MN," 3GPP TSG-RAN3 Meeting #107bis-e, R3-201891, Apr. 20-30, 2020.
Nokia et al., "Enabling inter-SN conditional PSCell change," 3GPP TSG-RAN WG3 Meeting #111-e, R3-210084, Feb. 5, 2020.
Ericsson, "Report for inter-node message design," 3GPP TSG-RAN WG1 Meeting #116, R2-2109871, Nov. 1-12, 2021.
Ericsson, "CPAC BL CR to TS 38.423," 3GPP TSG-RAN WG3 Meeting #113-e, R3-213192, Aug. 16-26, 2021.
English Translation of Chinese Office Action, dated Jan. 30, 2026 (13 pages).
Chinese Office Action, dated Jan. 30, 2026 (14 pages).
ZTE Corporation, Sanechips, "Discussion on conditional PSCell addition/ change", Aug. 28, 2020.
CATT, "TP for TS37.340 BLCR Conditional SN Addition Change Procedure", Nov. 22, 2019.

* cited by examiner

DUAL CONNECTIVITY MOBILE COMMUNICATION SYSTEM

CROSS REFERENCE TO RELATED APPLICATION

This patent application is a U.S. National Stage application of International Patent Application Number PCT/EP2021/077332 filed Oct. 5, 2021, which is hereby incorporated by reference in its entirety, and claims priority to IN 202041045909 filed Oct. 21, 2020.

FIELD

This present specification relates to control of dual connectivity mobile communication systems.

BACKGROUND

In a dual connectivity mobile communication system, a master node is provided. A user device may move from one master node to another using a handover process. Similarly, the user device may move from one secondary node to another secondary node using a primary secondary cell (PSCell) change process. There remains a need for further developments in this field.

SUMMARY

In a first aspect, this specification describes an apparatus comprising means for performing: sending an addition request from a master node of a dual connectivity mobile communication system to a target secondary node (e.g. one or more of a plurality of secondary target nodes) of the dual connectivity mobile communication system, wherein each addition request includes information relating to a maximum number of primary secondary cells that can be prepared for primary secondary cell change by said target secondary node; and receiving a response to the addition request from the target secondary node, wherein said response indicates how many primary secondary cells have been prepared by said target secondary node in response to said addition request.

In a second aspect, this specification describes an apparatus comprising means for performing: receiving an addition request from a master node of a dual connectivity mobile communication system at a target secondary node of the dual connectivity mobile communication system, wherein each addition request includes information relating to a maximum number of primary secondary cells that can be prepared for primary secondary cell change by said target secondary node; determining which of one or more available primary secondary cells of the target secondary node to prepare for primary secondary cell change; and sending an indication to the master node indicating how many primary secondary cells have been prepared by said target secondary node in response to said addition request.

In a third aspect, this specification describes an apparatus comprising means for performing: sending a change required message from a source secondary node to a master node of a dual connectivity mobile communication system, wherein the change required message provides information relating to a maximum number of primary secondary cells that can be prepared for primary secondary cell change by a target secondary node.

In a fourth aspect, this specification describes a method comprising: sending an addition request from a master node of a dual connectivity mobile communication system to a target secondary node of the dual connectivity mobile communication system, wherein each addition request includes provides information relating to a maximum number of primary secondary cells that can be prepared for primary secondary cell change by said target secondary node; and receiving a response to the addition request from the target secondary node indicating how many primary secondary cells have been prepared by said target secondary node in response to said addition request.

In a fifth aspect, this specification describes a method comprising: receiving an addition request from a master node of a dual connectivity mobile communication system at a target secondary node of the dual connectivity mobile communication system, wherein each addition request includes information relating to a maximum number of primary secondary cells that can be prepared for primary secondary cell change by said target secondary node; determining which of one or more available primary secondary cells of the target secondary node to prepare for primary secondary cell change; and sending an indication to the master node indicating how many primary secondary cells have been prepared by said target secondary node in response to said addition request.

In a sixth aspect, this specification describes a method comprising: sending a change required message from a source secondary node to a master node of a dual connectivity mobile communication system, wherein the change required message provides information relating to a maximum number of primary secondary cells that can be prepared for primary secondary cell change by a target secondary node.

In a seventh aspect, this specification describes computer-readable instructions which, when executed by computing apparatus, cause the computing apparatus to perform (at least) any method as described above with reference to any one of the fourth, fifth and sixth aspects.

In an eighth aspect, this specification describes a computer-readable medium (such as a non-transitory computer-readable medium) comprising program instructions stored thereon for performing (at least) any method as described above with reference to any one of the fourth, fifth and sixth aspects.

In a ninth aspect, this specification describes an apparatus comprising: at least one processor; and at least one memory including computer program code which, when executed by the at least one processor, causes the apparatus to perform (at least) any method as described above with reference to any one of the fourth, fifth and sixth aspects.

In a tenth aspect, this specification describes a computer program comprising instructions for causing an apparatus to perform any method as described above with reference to any one of the fourth, fifth and sixth aspects.

In an eleventh aspect, this specification describes an apparatus comprising: means (such as a master node of a dual connectivity mobile communication system) for sending an addition request to a target secondary node, wherein each addition request includes information relating to a maximum number of primary secondary cells that can be prepared for primary secondary cell change by said target secondary node; and means (such as the master node) for receiving a response to the addition request from the target secondary node indicating how many primary secondary cells have been prepared by said target secondary node in response to said addition request.

In a twelfth aspect, this specification describes an apparatus comprising: means (such as a target secondary node of a dual connectivity mobile communication system) for receiving an addition request from a master node of the dual connectivity mobile communication system, wherein each addition request includes information relating to a maximum number of primary secondary cells that can be prepared for primary secondary cell change by said target secondary node; means (such as a control module at the target secondary node) for determining which of one or more available primary secondary cells of the target secondary node to prepare for primary secondary cell change; and means (such as the target secondary node) for sending an indication to the master node indicating how many primary secondary cells have been prepared by said target secondary node in response to said addition request.

In a twelfth aspect, this specification describes an apparatus comprising: means (such as a source secondary node of a dual connectivity mobile communication system) for sending a change required message to a master node of the dual connectivity mobile communication system, wherein the change required message provides information relating to a maximum number of primary secondary cells that can be prepared for primary secondary cell change by a target secondary node.

BRIEF DESCRIPTION OF THE DRAWINGS

Example embodiments will now be described, by way of example only, with reference to the following schematic drawings, in which.

DETAILED DESCRIPTION

Figure 1:
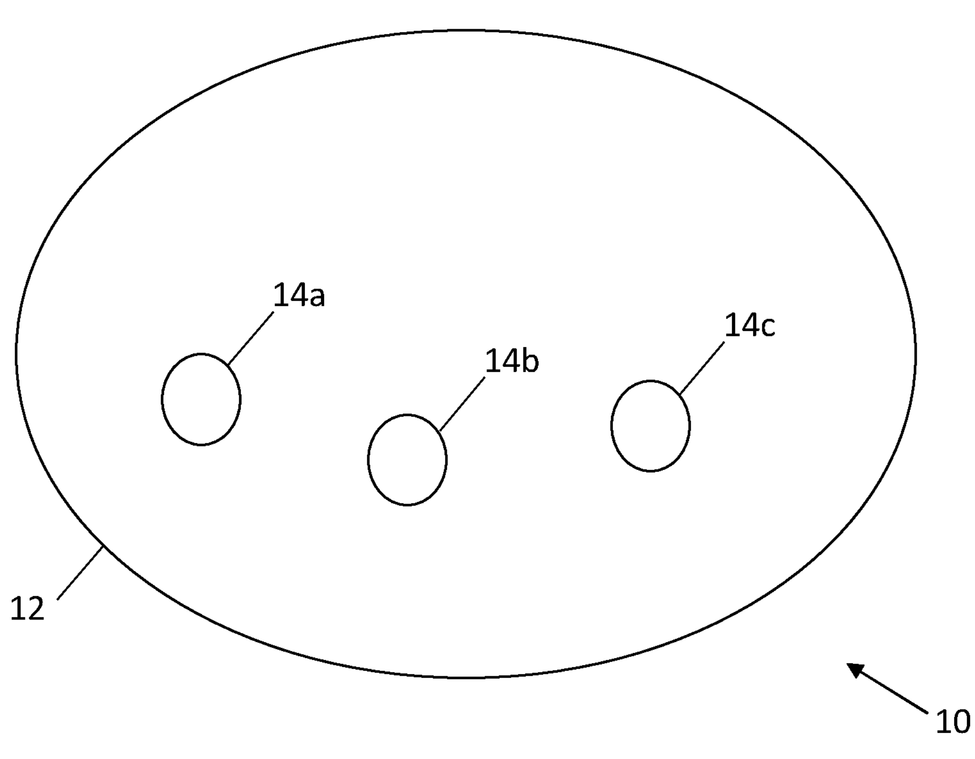
FIGS. 1 to 3 show systems in accordance with example embodiments.

The scope of protection sought for various example embodiments of the invention is set out by the independent claims. The example embodiments and features, if any, described in the specification that do not fall under the scope of the independent claims are to be interpreted as examples useful for understanding various example embodiments of the invention.

In the description and drawings, like reference numerals refer to like elements throughout.

In a dual connectivity mobile communication system, a master node is provided. The master node may include one or more cells. One or more secondary nodes (e.g. 5G nodes) may also be provided. Each secondary node may include one or more cells.

FIG. 1 shows a system, indicated generally by the reference numeral 10, in accordance with an example embodiment. The system 10 forms part of an example dual connectivity system. The system 10 comprises a first cell 12 that is a cell of the master node and a plurality of secondary communication nodes 14*a*, 14*b* and 14*c*.

A user device (UE) may move from one master node to another. The transfer from one master node to another master node is referred to as a handover. Similarly, the UE may move from one secondary node to another secondary node in a process referred to as conditional primary secondary cell (PSCell) change, wherein various conditions can be defined to control the change from one secondary cell to another.

A changeover from one master node to another or from one secondary node to another may be implemented in the event that one or more conditions are met. In the context of master nodes, this is referred to as conditional handover (CHO). For example, a source node may define an execution condition for the handover and the handover is executed autonomously by the UE when the relevant condition expires. In order to maximise success, the source node may configure several (e.g. up to 8) target cells, which will then be ready to admit the UE once it may access one of them.

In the context of secondary cells, such conditional changeover is referred to as conditional primary secondary cell change (PSCell) change (CPC).

Figure 2:
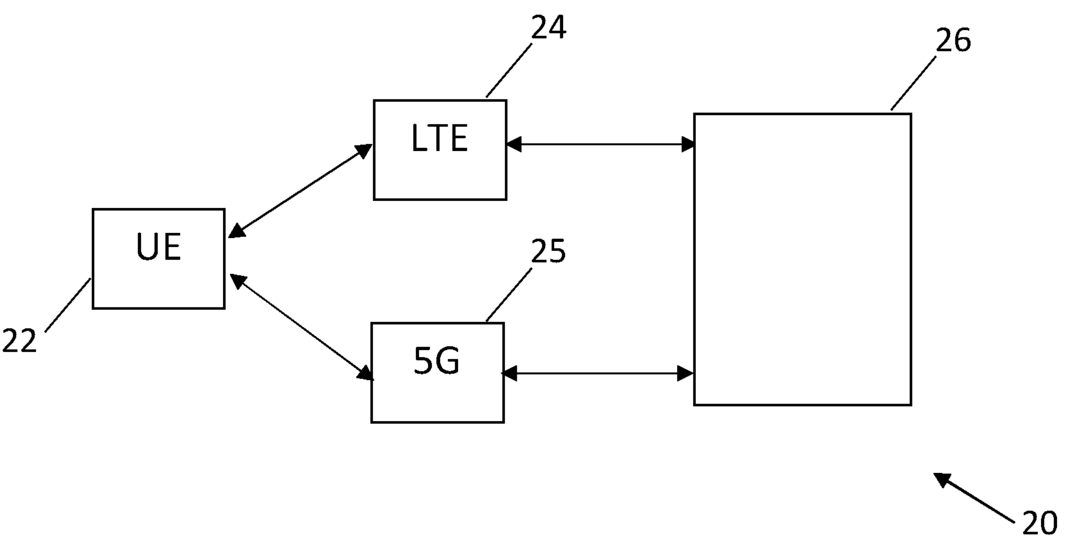

FIG. 2 shows a system, indicated generally by the reference numeral 20, in accordance with an example embodiment. The system 20 comprises a user device (UE) 22, a master node 24, a secondary node 25 and an external system 26. In the system 20, the master node is an LTE (4G) mobile communication system and the secondary node 25 is a 5G mobile communication system. Thus, the UE can communicate with the external system 26 via one or both of the 4G and 5G communication systems.

By way of example, a number of 5G nodes may be provided within the area of an LTE node. As the UE 22 moves around the 4G node, the UE may be able to communicate via different 5G nodes at different times (and may sometimes have no 5G access at all). Consider, for example, the system 10 in which the first cell 12 is an example of an LTE node 24 and the secondary communication nodes 14*a*, 14*b* and 14*c* are examples of 5G nodes 25. As the UE 22 moves around the first cell 12, conditional PSCell changes may need to be controlled such that the UE can make use of the secondary communication nodes.

Conditional primary secondary cell change (PSCell) change (CPC) may be initiated at a master node (MN-initiated CPC) or at a secondary node (SN-initiated CPC). Examples of both configurations are discussed below.

In case of conditional primary secondary addition (CPA) or inter-SC CPC, the initiating node for the addition or secondary node change may prepare multiple target PSCells. In CPA, the initiating node is a master node, whereas for inter-secondary node change, the initiating node can be either a master node or a secondary node depending on whether master node (MN) initiated secondary node (SN) change or secondary node initiated SN change applies. Selection of those cells depends on the measurements reported from the UE.

Figure 3:
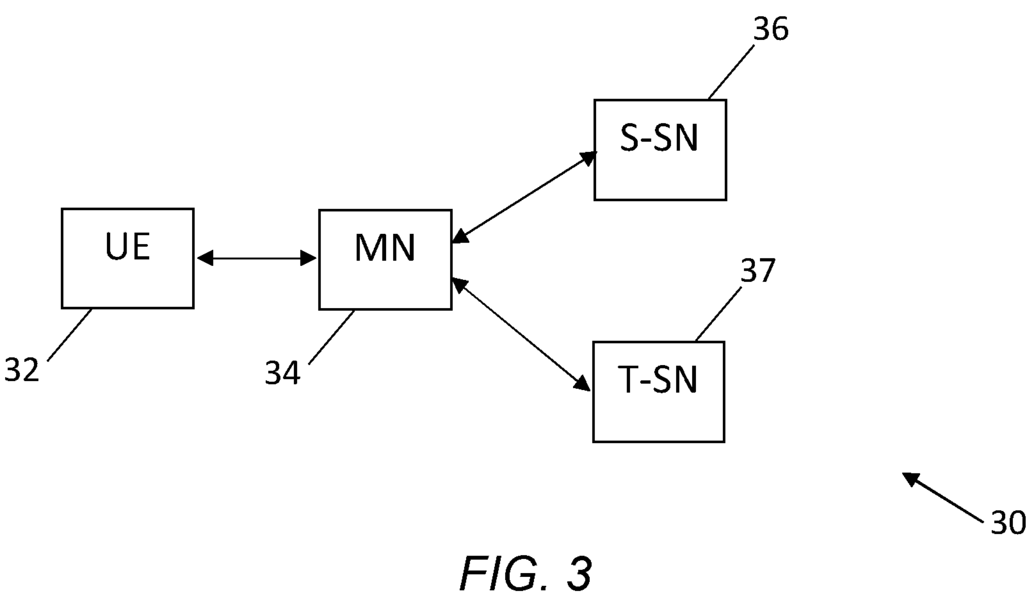

FIG. 3 shows a system, indicated generally by the reference numeral 30, in accordance with an example embodiment. The system 30 comprises a user device (UE) 32 (such as the UE 22 described above), a master node 34 (such as the LTE node 24 described above), a source secondary node 36 and a target secondary node 37 (such as the 5G node 25 described above).

Figure 4:
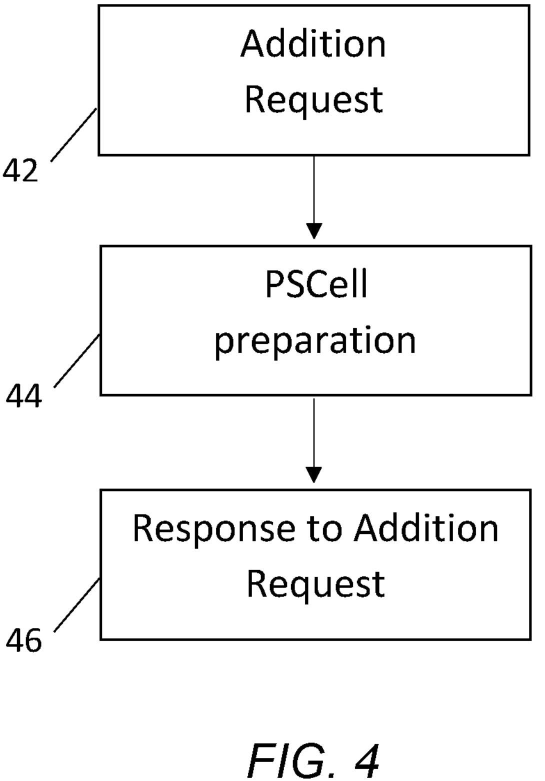
FIG. 4 is a flowchart showing an algorithm in accordance with an example embodiment.

FIG. 4 is a flowchart showing an algorithm, indicated generally by the reference numeral 40, in accordance with an example embodiment. The algorithm 40 may be implemented using the system 30.

At operation 42 of the algorithm 40, an Addition Request is sent from a master node (such as the master node 34 of the system 30) of a dual connectivity mobile communication system to a target secondary node of the dual connectivity mobile communication system. The target secondary node (such as target secondary node 37) may be one or more of a plurality of target secondary nodes (see, for example, the secondary nodes 14*a* to 14*c* of the system 10 described above).

The Addition Request provides information relating to a maximum number of primary secondary cells that can be prepared for primary secondary cell change by said target secondary node.

At operation 44, in response to receiving the Addition Request, a determination is made at a target secondary node of which of one or more available primary secondary cells of the target secondary node to prepare for primary secondary cell change.

At operation 46, a response to the Addition Request is sent from the target secondary node 37 and received at the master node 34. That response may be in the form of an Addition Request Acknowledge signal (as discussed further below). The response 46 indicates how many primary secondary cells have been prepared by said target secondary node in response to said Addition Request and may include RRC reconfiguration information for each primary secondary cell prepared by the target secondary node.

Figure 5:
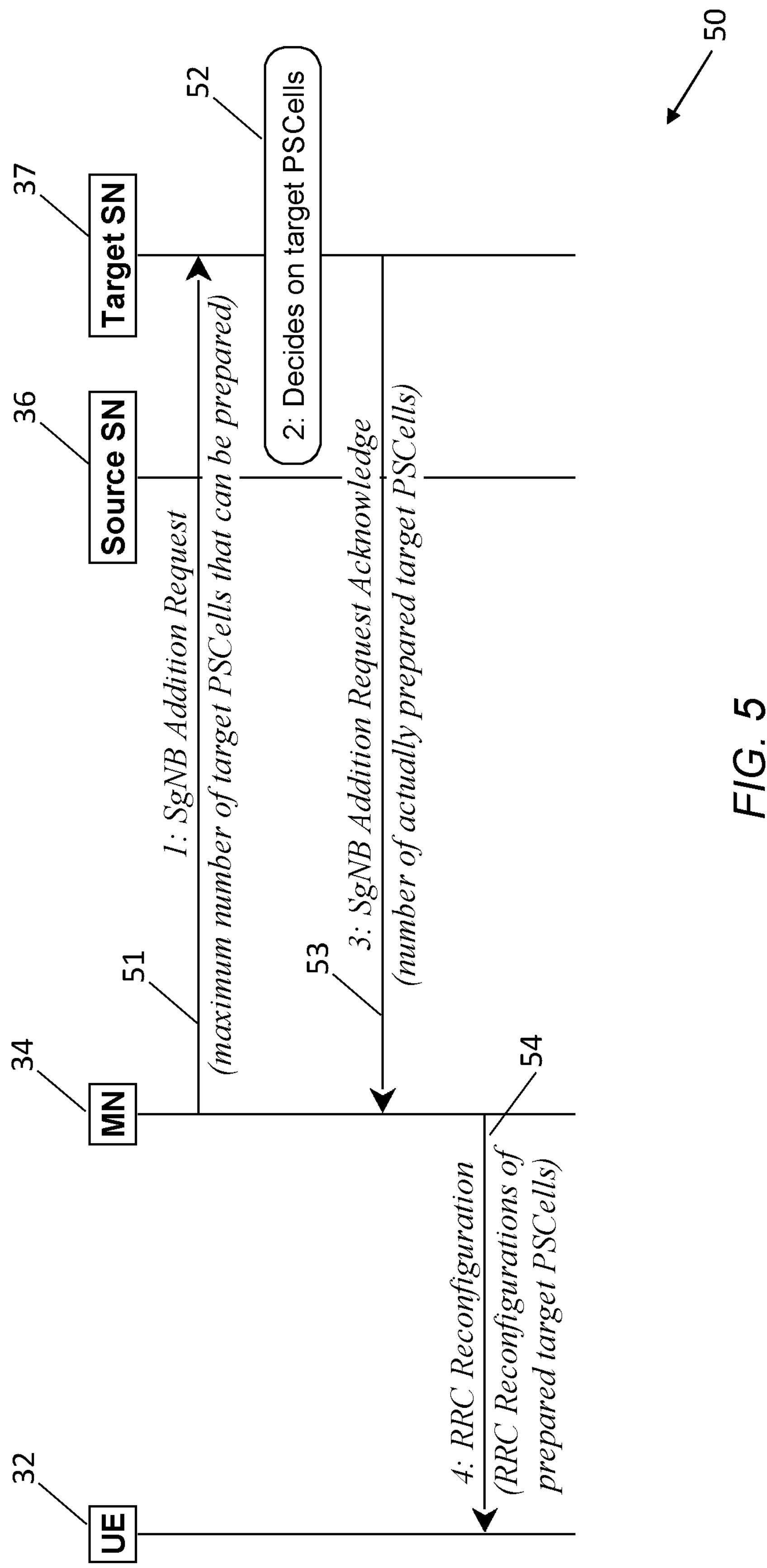
FIG. 5 is a message sequence in accordance with an example embodiment.

FIG. 5 is a message sequence, indicated generally by the reference numeral 50, in accordance with an example embodiment. The message sequence 50 shows messages transmitted between the user device 32, the master node 34, the source secondary node 36 and the target secondary node 37 of the system 30 described above. The message sequence is an example implementation of the algorithm 40.

The message sequence so starts with an Addition Request message 51 being sent from the master node 34 to the target secondary node 37 of a dual connectivity mobile communication system, thereby implementing the operation 42 of the algorithm 40. The Addition Request provides information relating to a maximum number of primary secondary cells that can be prepared for primary secondary cell change by said target secondary node. For example, the Addition Request message 51 may include a parameter that includes a number indicating the maximum number of primary secondary cells that can be so prepared.

In response to the message 51, the target secondary node determines 52 which of one or more available primary secondary cells of the target secondary node to prepare for primary secondary cell change (thereby implementing the operation 44 of the algorithm 40).

An Addition Request Acknowledge message 53 is sent from the target secondary node 37 to the master node 34 that indicates how many primary secondary cells have been prepared by said target secondary node in response to said addition request. The message 53 may also include RRC reconfiguration information for each primary secondary cell prepared by the target secondary node.

In response to the message 53, the master node 34 sends an RRC Reconfiguration message 54 to the user device 32 including information of primary secondary cells prepared by said target secondary node 37. Each prepared primary secondary cell may be assigned a condition for access to that primary secondary cell, which condition may be provided to the user device 32 in the message 54.

In the algorithm 40 and the message sequence 50, the sending of the Addition Request message is initiated by the master node 34. This is not essential to all example embodiments, as discussed further below.

Figure 6:
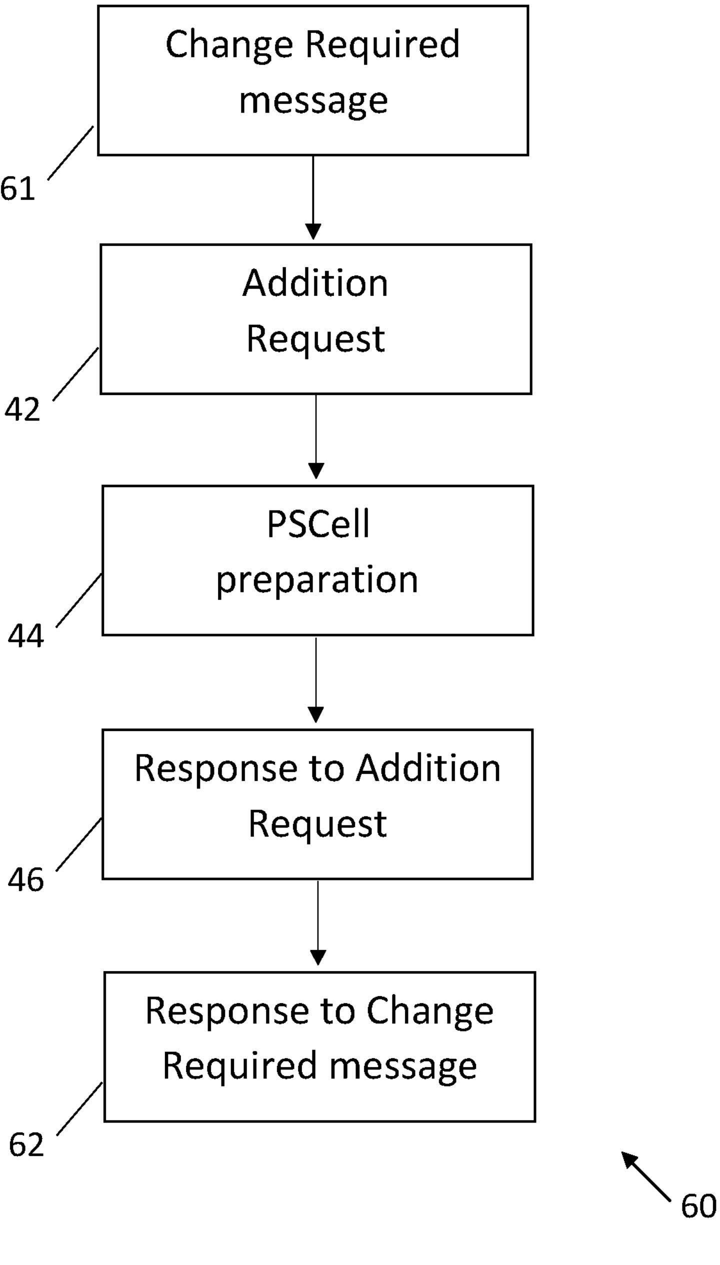
FIG. 6 is a flowchart showing an algorithm in accordance with an example embodiment.

FIG. 6 is a flowchart showing an algorithm, indicated generally by the reference numeral in accordance with an example embodiment. The algorithm 60 may be implemented using the system 30.

At operation 61 a Change Required message is received at the master node. As discussed further below, the Change Required message provides information relating to the maximum number of primary secondary cells that can be prepared for primary secondary cell change by a target secondary node.

In response to the Change Required message, the operation 42 to 46 of the algorithm 40 are triggered, such that an Addition Request is sent from the master node to the target secondary node (operation 42), a determination is made at the target secondary node of which of one or more available primary secondary cells of the target secondary node to prepare for primary secondary cell change (operation 44) and a response to the Addition Request is sent from the target secondary node to the master node (operation 46).

In the operation 42 of the algorithm 60, the Addition Request includes the information relating to the maximum number of primary secondary cells that can be prepared for primary secondary cell change provided in the operation 61.

At operation 62, a response to the Change Required message originally received in the operation 61 is generated.

Figure 7:
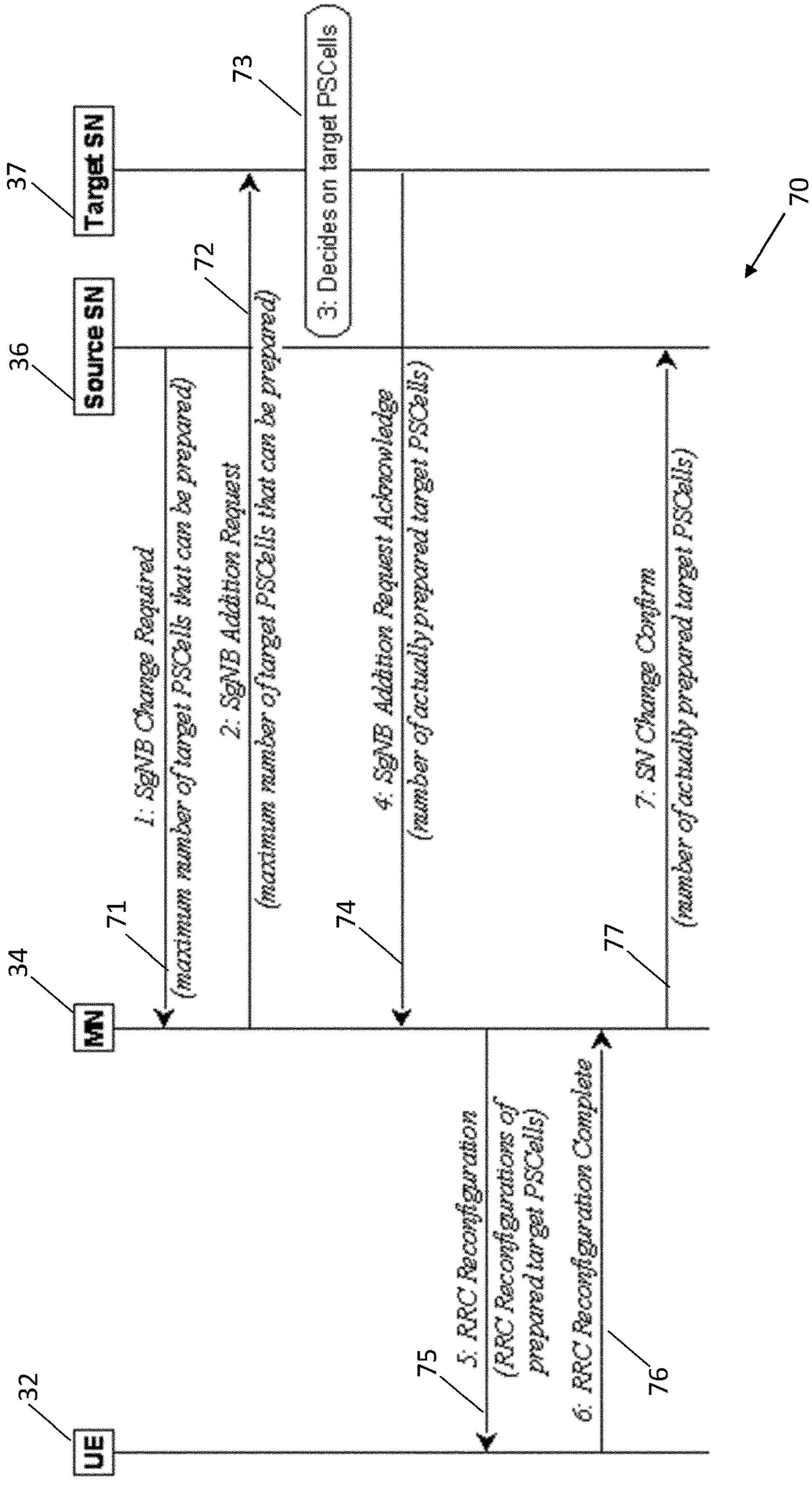
FIGS. 7 to 11 are message sequences in accordance with example embodiments.

FIG. 7 is a message sequence, indicated generally by the reference numeral 70, in accordance with an example embodiment. The message sequence 70 shows messages transmitted between the user device 32, master node 34, source secondary node 36 and target secondary node 37 of the system 30 described above. The message sequence 70 is an example implementation of the algorithm 60.

The message sequence 70 starts with a Change Required message 71 being sent from the source secondary node 36 to the master node 34, thereby implementing the operation 71 of the algorithm 70. The Change Required message 71 provides information relating to the maximum number of primary secondary cells that can be prepared for primary secondary cell change by a target secondary node.

On receipt of the Change Required message 71, an Addition Request message 72 is sent from the master node 34 to the target secondary node 37 of a dual connectivity mobile communication system. As with the Addition Request message 51, the message 72 provides information relating to a maximum number of primary secondary cells that can be prepared for primary secondary cell change by said target secondary node.

In response to the Addition Request message 72, the target secondary node determines 73 which of one or more available primary secondary cells of the target secondary node to prepare for primary secondary cell change.

An Addition Request Acknowledge message 74 is sent from the target secondary node 37 to the master node 34 that indicates how many primary secondary cells have been prepared by said target secondary node in response to said Addition Request. The message 74 may also include RRC reconfiguration information for each primary secondary cell prepared by the target secondary node.

In response to the message 74, the master node 34 sends an RRC Reconfiguration message 75 to the user device 32 including information of primary secondary cells prepared by said target secondary node 37. Each prepared primary secondary cell may be assigned a condition for access to that primary secondary cell, which condition may be provided to the user device 32 in the message 54.

On receipt of an RRC Reconfiguration Complete message 76 from the user device 32, the master node 34 sends a Change Confirm message 77 to the source secondary node 36 in response to the Change Required message 71. The Change Confirm message 77 indicates how many primary secondary cells have been prepared by the target secondary node in response to said addition request and is an example implementation of the operation 62 of the algorithm 60.

Thus, in the algorithms 40 and 60 and the message sequences 50 and 70, an initiating node (e.g. the master node 34 or the source secondary node 36) provides a PSCell limit (e.g. a quota) for sending to the target secondary node in an Addition Request message. The target second node should not prepare more cells than the limit. The target secondary node may also be enabled to let the master node know how many cells it has actually prepared, so that the initiating node may, for example, offer possibly unused part of the quota to another target secondary node. In case of the secondary node-initiated inter-secondary node CPC, the decision on the limit may be made at the source secondary node and sent to the master node in the second node Change Required message (see section 10.5 of TS 37.340).

In at least some of the example embodiments described above, the information relating to a maximum number of primary secondary cells that can be prepared for primary secondary cell change by a particular target secondary node may take the form of a number included in the message. This is not essential to all example embodiments, as discussed further below.

Figure 8:
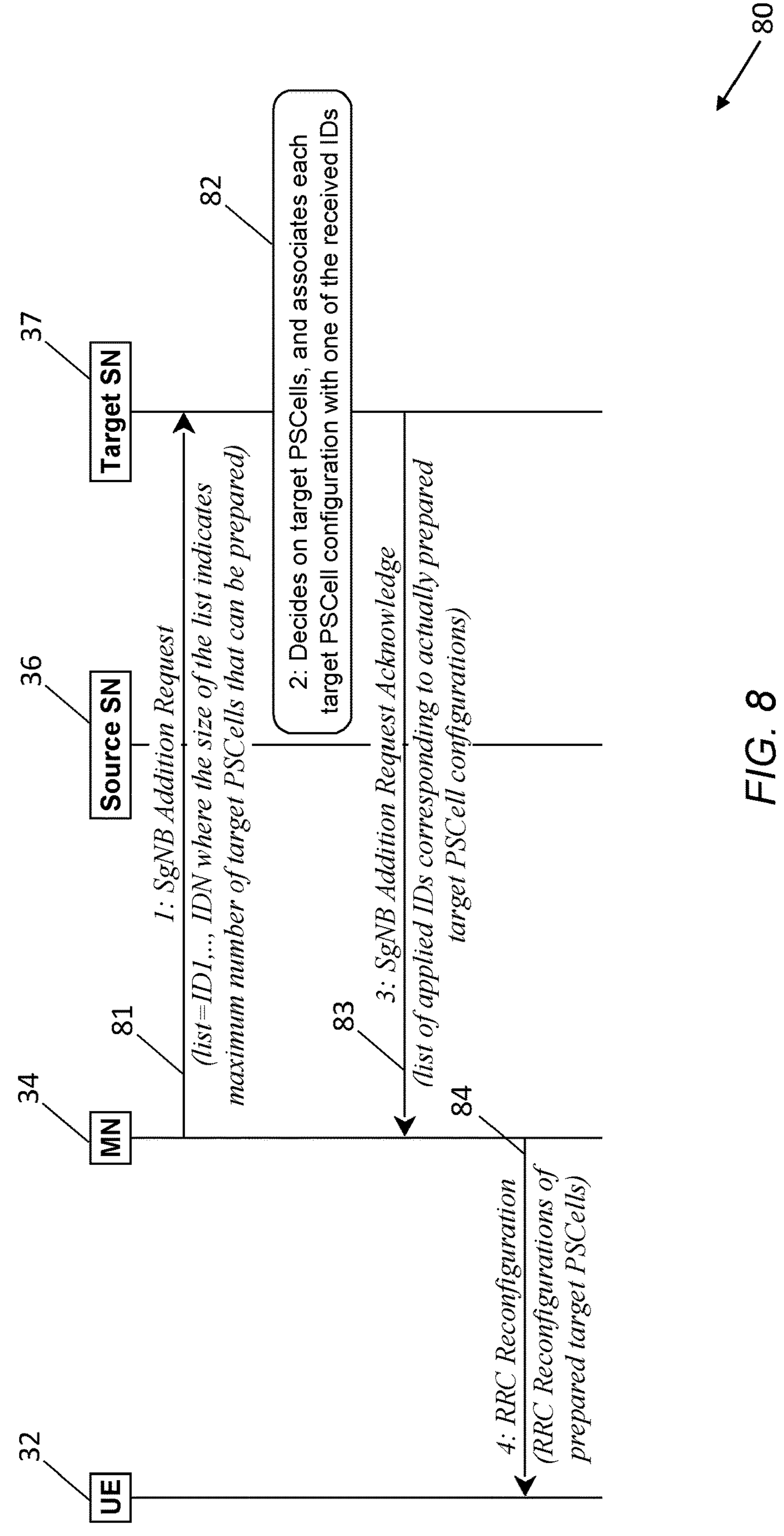

FIG. 8 is a message sequence, indicated generally by the reference numeral 80, in accordance with an example embodiment. The message sequence 80 shows messages transmitted between the user device 32, master node 34, source secondary node 36 and target secondary node 37 of the system 30 described above. The message sequence 80 is an example implementation of the algorithm 40 and is similar to the message sequence 50 described above.

The message sequence 80 starts with an Addition Request message 81 being sent from the master node 34 to the target secondary node of a dual connectivity mobile communication system, thereby implementing the operation 42 of the algorithm 40. The Addition Request message 81 differs from the message 51 described above by providing information relating to a maximum number of primary secondary cells that can be prepared for primary secondary cell change by said target secondary node in the form of a list of cell identifiers (e.g. ID1, ID2 . . . ). The number of cell identifiers in the list indicates the maximum number of primary secondary cells that can be prepared for primary secondary cell change.

In response to the message 81, the target secondary node determines 82 which of one or more available primary secondary cells of the target secondary node to prepare for primary secondary cell change (thereby implementing the operation 44 of the algorithm 40).

An Addition Request Acknowledge message 83 is sent from the target secondary node 37 to the master node 34. The Addition Request Acknowledge message 83 includes a list of cell identifiers of the prepared primary secondary cells. The number of cell identifiers included in the message 83 indicates how many primary secondary cells have been prepared by said target secondary node in response to said Addition Request. The message 83 may also include RRC reconfiguration information for each primary secondary cell prepared by the target secondary node.

By way of example, the message 81 may take the form:

Addition Request (ID5, ID6, ID7).

In response, the message 83 may take the form:

Addition Request Acknowledge ((ID5, target PSCell1 config), (ID6, target PSCe112 config)).

Thus, in the example message 83, only two PSCells are configured (corresponding to ID5 and ID6). The RRC configuration details for those PSCells are provided in the message 83.

In response to the message 83, the master node 34 sends an RRC Reconfiguration message 84 to the user device 32 including information of primary secondary cells prepared by said target secondary node 37. Each prepared primary secondary cell may be assigned a condition for access to that primary secondary cell, which condition may be provided to the user device 32 in the message 54.

In the algorithm 40 and the message sequences 50 and 80, the sending of the Addition Request message is initiated by the master node 34. This is not essential to all example embodiments, as discussed further below.

Figure 9:
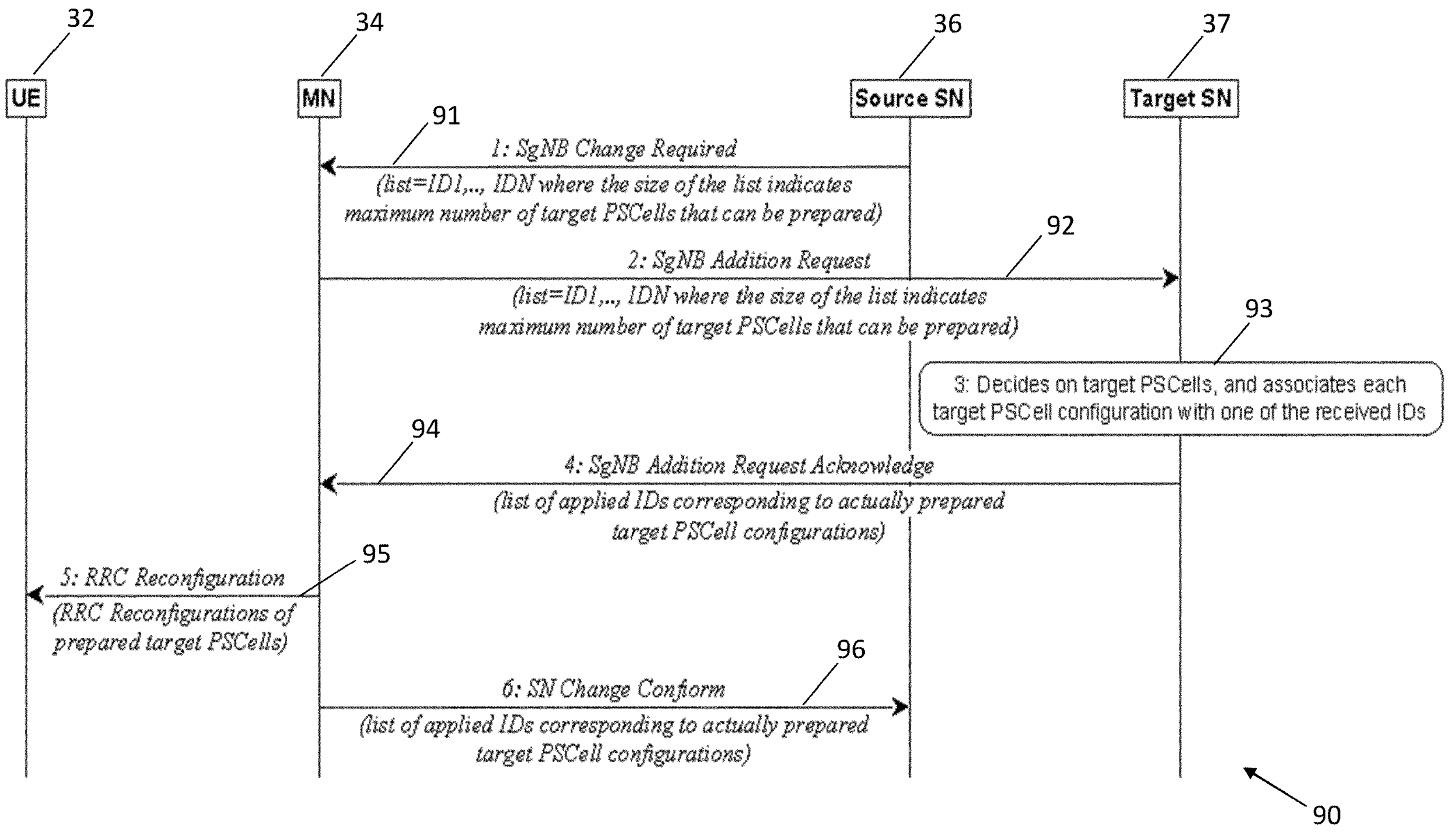

FIG. 9 is a message sequence, indicated generally by the reference numeral 90, in accordance with an example embodiment. The message sequence 90 shows messages transmitted between the user device 32, master node 34, source secondary node 36 and target secondary node 37 of the system 30 described above. The message sequence 90 is an example implementation of the algorithm 60 and is similar to the message sequence 70 described above.

The message sequence 90 starts with a Change Required message 91 being sent from the source secondary node 36 to the master node 34, thereby implementing the operation 61 of the algorithm 60. The Change Required message 91 provides information relating to a maximum number of primary secondary cells that can be prepared for primary secondary cell change by said target secondary node in the form of a list of cell identifiers (e.g. ID1, ID2 . . . ). The number of cell identifiers in the list indicates said number of primary secondary cells.

On receipt of the Change Required message 91, an Addition Request message 92 is sent from the master node 34 to the target secondary node 37 of a dual connectivity mobile communication system. As with the Addition Request message 81, the message 92 provides information relating to a maximum number of primary secondary cells that can be prepared for primary secondary cell change by said target secondary node in the form of a list of cell identifiers.

In response to the Addition Request message 92, the target secondary node determines 93 which of one or more available primary secondary cells of the target secondary node to prepare for primary secondary cell change.

An Addition Request Acknowledge message 94 is sent from the target secondary node 37 to the master node 34. The Addition Request Acknowledge message 94 includes a list of cell identifiers of the prepared primary secondary cells. The number of cell identifiers included in the message 94 indicates how many primary secondary cells have been prepared by said target secondary node in response to said Addition Request. The message 94 may also include RRC reconfiguration information for each primary secondary cell prepared by the target secondary node.

In response to the message 94, the master node 34 sends an RRC Reconfiguration message 95 to the user device 32 including information of primary secondary cells prepared by said target secondary node 37. Each prepared primary secondary cell may be assigned a condition for access to that primary secondary cell, which condition may be provided to the user device 32 in the message 95.

On receipt of an RRC Reconfiguration Complete message (not shown), the master node 34 sends a Change Confirm message 96 to the source secondary node 36 in response to the Change Required message 91. The Change Confirm message 96 includes the list of cell identifiers provided in the message 94, thereby indicating how many primary secondary cells have been prepared by the target secondary node.

Thus, in order to enable the initiating node (master node 34 or source secondary node 36) to configure per-cell triggering conditions and to enable the master node, source secondary node or target secondary node to request modifications of prepared PSCells, the target secondary node that prepares the cells may provide some identifier of each of the prepared PSCell (outside of the RRC configuration, which may not be readable by the mast node). In the message sequences 50 and 70, such identifiers may be some abstract number which may be pre-allocated by the initiating node. In the message sequences 80 and 90, cell IDs of the prepared PSCells may be provided.

Figure 10:
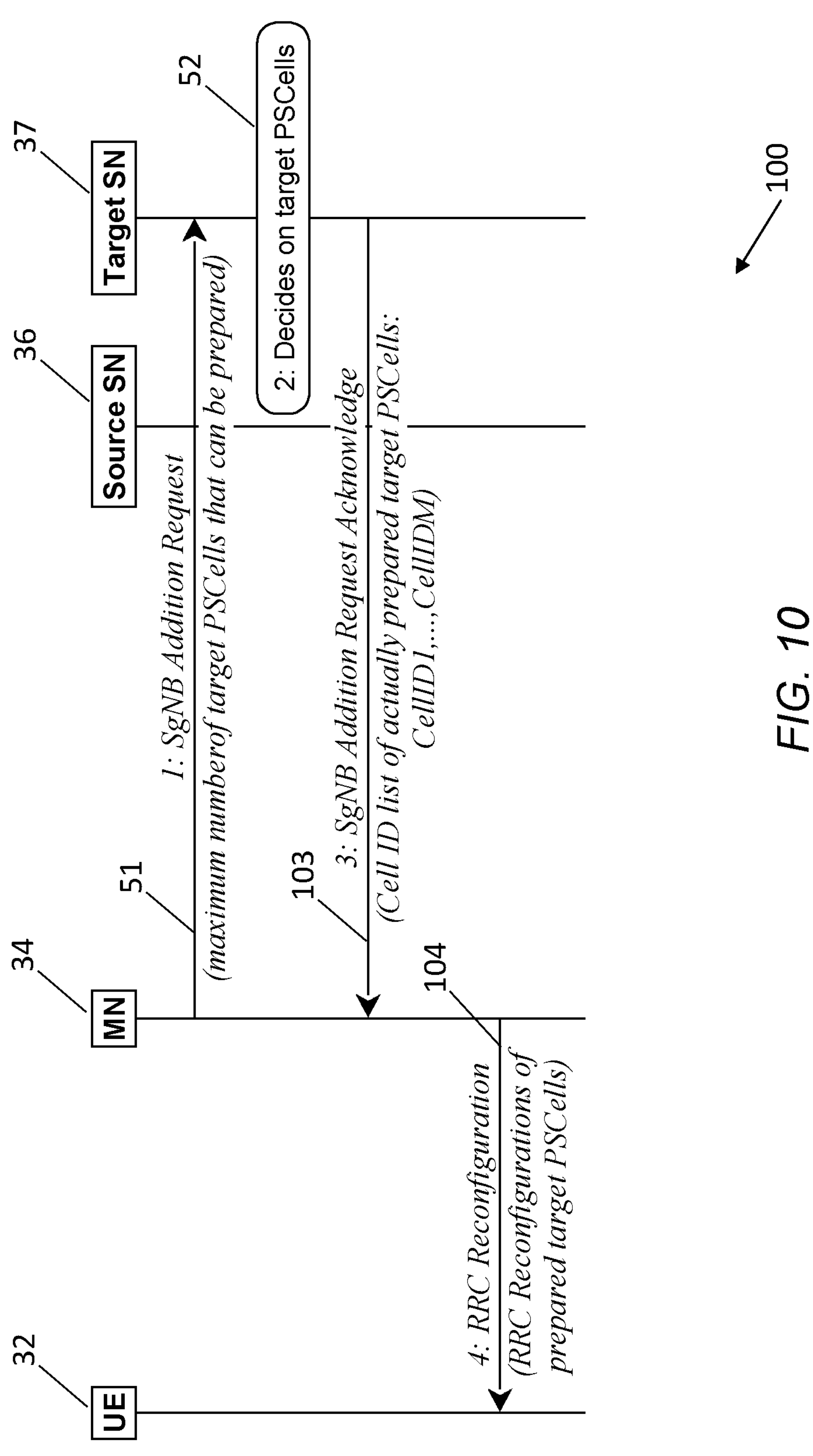

FIG. 10 is a message sequence, indicated generally by the reference numeral 100, in accordance with an example embodiment.

The message sequence 100 shows messages transmitted between the user device 32, master node 34, source secondary node 36 and target secondary node 37 of the system 30 described above. The message sequence wo is an example implementation of the algorithm 40 and is similar to the message sequences 50 and 80 described above.

The message sequence 100 starts with the Addition Request message 51 being sent from the master node 34 to the target secondary node of a dual connectivity mobile communication system, thereby implementing the operation 42 of the algorithm 40. As described above, the Addition Request message 51 includes information relating to a maximum number of primary secondary cells that can be prepared for primary secondary cell change by said target secondary node.

In response to the message 51, the target secondary node determines 52 which of one or more available primary secondary cells of the target secondary node to prepare for primary secondary cell change (thereby implementing the operation 44 of the algorithm 40).

An Addition Request Acknowledge message 103 is sent from the target secondary node 37 to the master node 34. The Addition Request Acknowledge message 103 includes a list of cell identifiers of the prepared primary secondary cells as is therefore similar to the message 83 described above. The number of cell identifiers included in the message 103 indicates how many primary secondary cells have been prepared by said target secondary node in response to said Addition Request. The message 103 may also include RRC reconfiguration information for each primary secondary cell prepared by the target secondary node.

By way of example, the message 51 may take the form:

Addition Request (Number of target PSCells=3).

In response, the message 103 may take the form:

Addition Request Acknowledge ((ID5, target PSCell1 config), (ID6, target PSCell2 config)).

Thus, only two PSCells are configured (corresponding to ID5 and ID6). The RRC configuration details for those PSCells are provided in the message 103.

In response to the message 103, the master node 34 sends an RRC Reconfiguration message 104 to the user device 32 including information of primary secondary cells prepared by said target secondary node 37. Each prepared primary secondary cell may be assigned a condition for access to that primary secondary cell, which condition may be provided to the user device 32 in the message 104.

Figure 11:
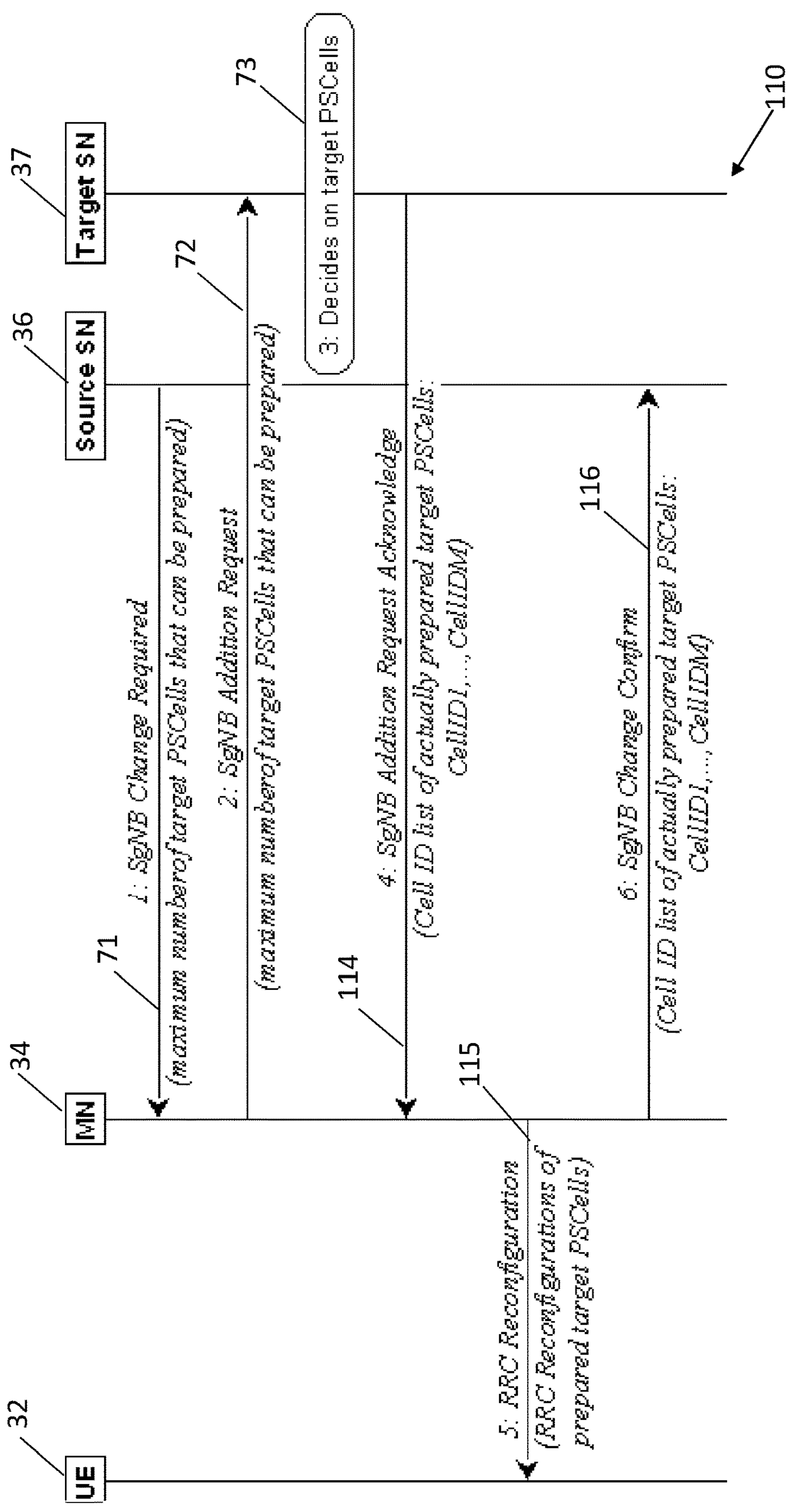

FIG. 11 is a message sequence, indicated generally by the reference numeral 110, in accordance with an example embodiment.

The message sequence 110 shows messages transmitted between the user device 32, master node 34, source secondary node 36 and target secondary node 37 of the system 30 described above. The message sequence 110 is an example implementation of the algorithm 60 and is similar to the message sequences 70 and 90 described above.

The message sequence 110 starts with the Change Required message 71 described above being sent from the source secondary node 36 to the master node 34, thereby implementing the operation 71 of the algorithm 70. The Change Required message 71 provides information relating to a maximum number of primary secondary cells that can be prepared for primary secondary cell change by said target secondary node, as described above.

On receipt of the Change Required message 71, an Addition Request message 72 is sent from the master node 34 to the target secondary node of a dual connectivity mobile communication system. The Addition Request message 72 provides information relating to a maximum number of primary secondary cells that can be prepared for primary secondary cell change by said target secondary node.

In response to the Addition Request message 72, the target secondary node determines 73 which of one or more available primary secondary cells of the target secondary node to prepare for primary secondary cell change.

An Addition Request Acknowledge message 114 is sent from the target secondary node 37 to the master node 34 that indicates how many primary secondary cells have been prepared by said target secondary node in response to said Addition Request. The Addition Request Acknowledge message 114 includes a list of cell identifiers of the prepared primary secondary cells. The number of cell identifiers included in the message 114 indicates how many primary secondary cells have been prepared by said target secondary node in response to said addition request. The message 114 may also include RRC reconfiguration information for each primary secondary cell prepared by the target secondary node.

In response to the message 114, the master node 34 sends an RRC Reconfiguration message 115 to the user device 32 including information of primary secondary cells prepared by said target secondary node 37. Each prepared primary secondary cell may be assigned a condition for access to that primary secondary cell, which condition may be provided to the user device 32 in the message 115.

On receipt of an RRC Reconfiguration Complete message (not shown), the master node 34 sends a Change Confirm message 116 to the source secondary node 36 in response to the Change Required message 71. The Change Confirm message 116 includes the list of cell identifiers provided in the message 114, thereby indicating how many primary secondary cells have been prepared by the target secondary node.

In some example embodiments, the initiating node (e.g. the master node MN 34 or source secondary node 36) may modify the number of target PSCells that a particular target node is allowed to prepare. A PSCell to be modified may be identified with an abstract identifier or simply by a cell ID. The initiating node may also increase and/or decrease the limit of target PSCells to be prepared by either providing a new limit number or a new (longer/shorter) list of identifiers.

Figure 12:
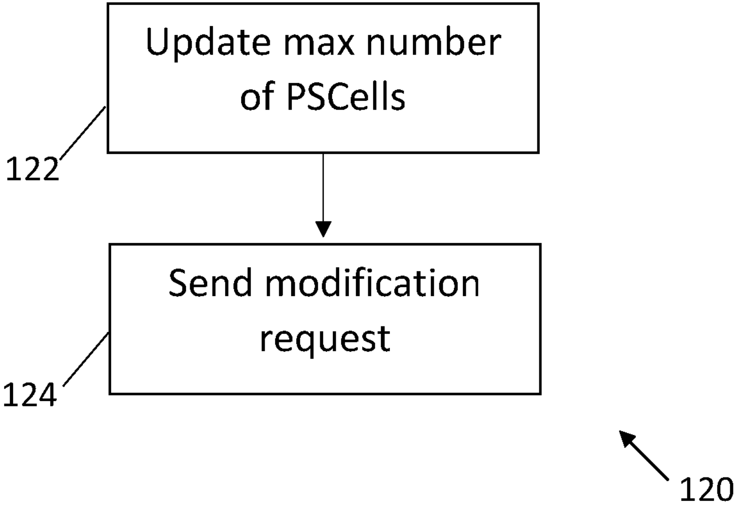
FIG. 12 is a flowchart showing an algorithm in accordance with an example embodiment.

By way of example, FIG. 12 is a flowchart showing an algorithm, indicated generally by the reference numeral 120, in accordance with an example embodiment.

The algorithm 120 starts at operation 122 where a maximum number of primary secondary cells that can be prepared for primary secondary cell change by said target secondary node is updated (e.g. increased or decreased).

At operation 124 of the algorithm 120, a Modification Request is sent to the relevant target secondary node, wherein the modification request includes information relating to the updated maximum number of primary secondary cells that can be prepared for primary secondary cell change by said target secondary node.

Thus, as described above, an initiating node may assign limits to the number of cells that may be prepared in each target secondary node (using an Addition Request message). That defined limit may later be increased or decreased, for example to instruct a secondary node to release some prepared PSCell cells).

For coordination of the access criteria, the initiating node may assign a list of identifiers to the target secondary node (as discussed above). The target secondary node may then link the identifiers with the actually prepared PSCells and send back the list of identifiers used in the RRC configurations. Thus, the initiating node and target secondary node are in synchronization with respect to the IDs of the prepared RRC Reconfigurations such that they can refer to the corresponding RRC Reconfiguration in case the initiating node or target secondary node would like to perform a modification or release of RRC Reconfiguration.

Thus, in some example embodiments:

- A master node may initiate Addition Preparation towards multiple target secondary nodes (SNs). In the case of SN-initiated secondary node change, a master node may be triggered by a source secondary node to initiate Addition Preparation towards multiple target secondary nodes.
- Each of the target secondary nodes may prepare multiple target PSCells and add them in the RRC Configuration for the relevant user device (UE).
- The master node may forward the RRC configuration to the UE without violating the standard limitations that is set with respect to the maximum number of prepared PSCells. On the other hand, the master node may not be obliged to read the RRC configuration prepared at the target secondary node; indeed, in some example embodiments, the master node may not be able to understand said RRC configuration information.
- Each prepared PSCell may be assigned separate condition for access.
- The situation may change and either the master node, or the target secondary node(s) hosting prepared PSCells may be able to modify the configuration.

Figure 13:
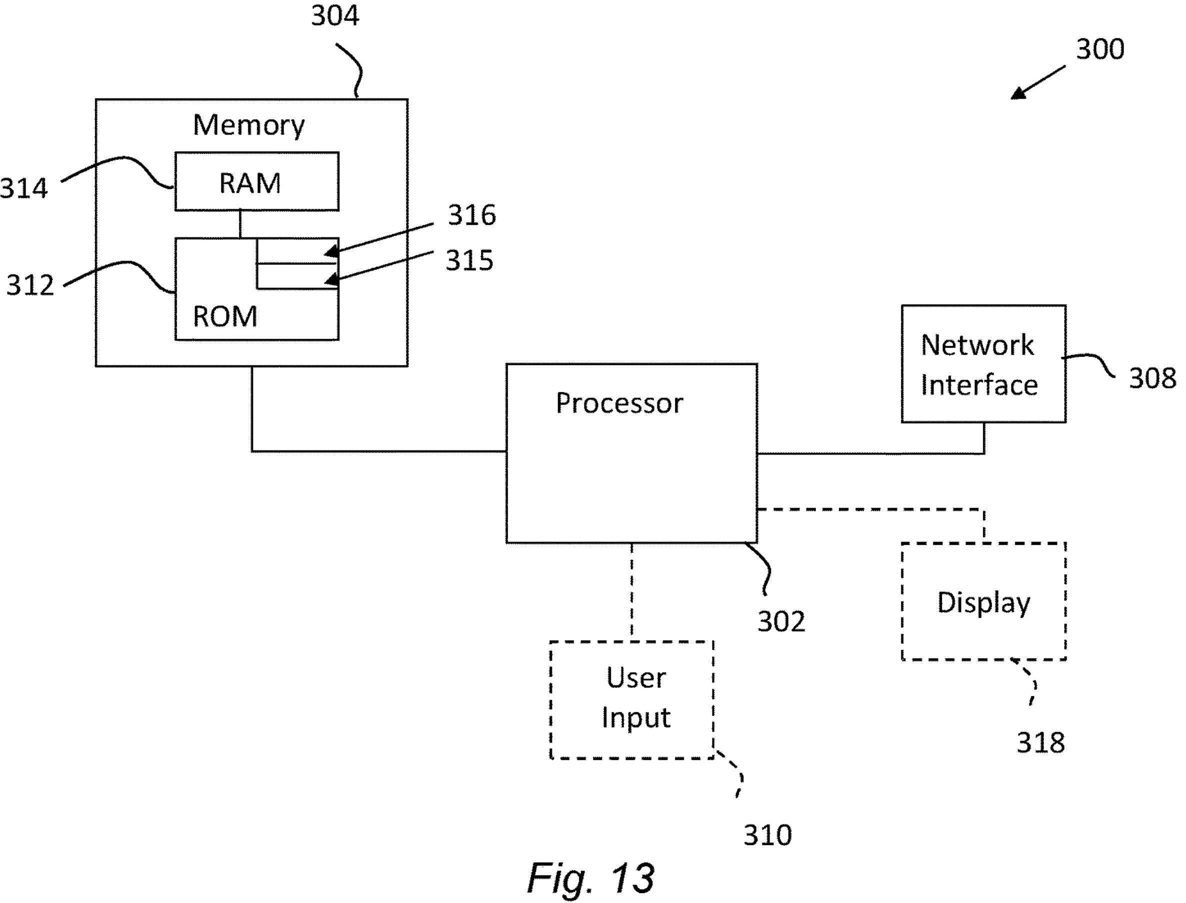
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms and message sequences 40, 50, 60, 70, 80, 90, 100, 110 and 120 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figures 14A, 14B:
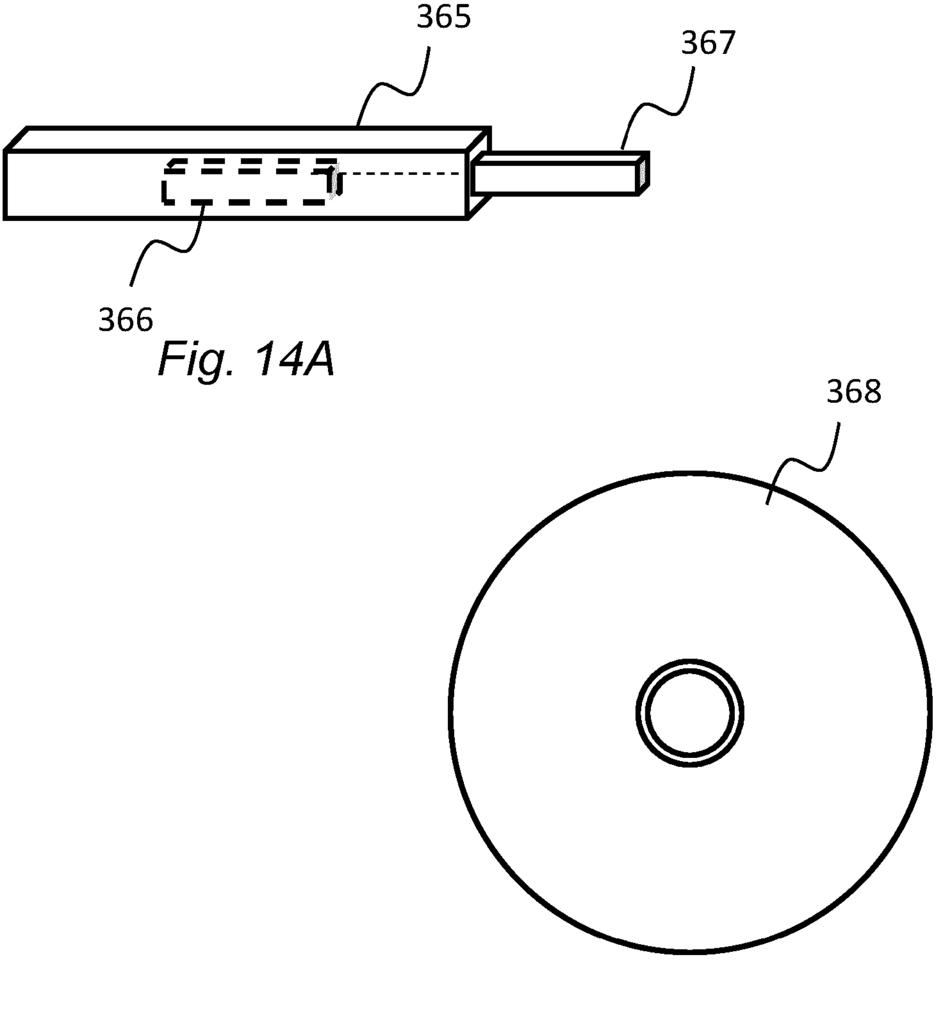
FIGS. 14A and 14B show tangible media, respectively a removable non-volatile memory unit and a compact disc (CD) storing computer-readable code which when run by a computer perform operations according to example embodiment.

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams and message sequences of FIGS. 4 to 12 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus, comprising:

at least one processor; and at least one non-transitory memory storing instructions that, when executed with the at least one processor, cause the apparatus to perform:

receiving a change required message from a source secondary node, wherein the change required message provides information relating to a maximum number of primary secondary cells that can be prepared for primary secondary cell change by a target secondary node;

sending, in response to said received change required message, an addition request from a master node of a dual connectivity mobile communication system to the target secondary node of the dual connectivity mobile communication system, wherein the addition request includes said information relating to the maximum number of the primary secondary cells that can be prepared for primary secondary cell change by said target secondary node; and receiving a response to the addition request from the target secondary node, wherein said response indicates how many of the primary secondary cells have been prepared by said target secondary node in response to said addition request.

2. The apparatus as claimed in claim 1, wherein the response to the addition request includes radio resource control reconfiguration information for each of the primary secondary cells prepared by the target secondary node.

3. The apparatus as claimed in claim 2, wherein the instructions, when executed with the at least one processor, cause the apparatus to perform forwarding radio resource control reconfiguration information of the primary secondary cells prepared by said target secondary node to a user device.

4. The apparatus as claimed in claim 1, wherein the change required message includes a list of identifiers, wherein the list of identifiers relates to the primary secondary cells that can be prepared.

5. The apparatus as claimed in claim 1, wherein the information relating to the maximum number of the primary secondary cells that can be prepared comprises a list of cell identifiers.

6. The apparatus as claimed in claim 1, wherein the response to the addition request received from the target secondary node includes a list of cell identifiers of the prepared primary secondary cells.

7. The apparatus as claimed in claim 6, wherein the instructions, when executed with the at least one processor, cause the apparatus to perform sending a list of identifiers from the master node to the source secondary node of the dual connectivity system, wherein the list of identifiers includes the list of cell identifiers of the prepared primary secondary cells.

8. The apparatus as claimed in claim 1, wherein the instructions, when executed with the at least one processor, cause the apparatus to perform updating the maximum number of the primary secondary cells that can be prepared for primary secondary cell change by said target secondary node.

9. The apparatus as claimed in claim 8, wherein the instructions, when executed with the at least one processor, cause the apparatus to perform sending a modification request to the target secondary node, wherein the modification request includes information relating to the updated maximum number of the primary secondary cells that can be prepared for primary secondary cell change by said target secondary node.

10. A method, comprising:

receiving a change required message from a source secondary node, wherein the change required message provides information relating to a maximum number of primary secondary cells that can be prepared for primary secondary cell change by a target secondary node sending, in response to said received change required message, an addition request from a master node of a dual connectivity mobile communication system to the target secondary node of the dual connectivity mobile communication system, wherein the addition request includes said information relating to the maximum number of the primary secondary cells that can be prepared for primary secondary cell change by said target secondary node;

and receiving a response to the addition request from the target secondary node indicating how many of the primary secondary cells have been prepared by said target secondary node in response to said addition request.

11. A non-transitory computer program storage device readable with an apparatus tangibly embodying a program of instructions executable with the apparatus for performing the method of claim 10.

* * * * *